United States Patent
Chou et al.

(10) Patent No.: US 10,753,442 B2
(45) Date of Patent: Aug. 25, 2020

(54) DUSTPROOFING DEVICE FOR USE WITH LINEAR MODULE

(71) Applicant: HIWIN TECHNOLOGIES CORP., Taichung (TW)

(72) Inventors: Cheng-Wen Chou, Taichung (TW); Yu-Ting Qiu, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 223 days.

(21) Appl. No.: 15/948,149

(22) Filed: Apr. 9, 2018

(65) Prior Publication Data

US 2019/0242469 A1 Aug. 8, 2019

(30) Foreign Application Priority Data

Feb. 8, 2018 (TW) .............................. 107104493 A

(51) Int. Cl.
*F16H 25/18* (2006.01)
*F16H 25/20* (2006.01)

(52) U.S. Cl.
CPC ..... *F16H 25/20* (2013.01); *F16H 2025/2031* (2013.01)

(58) Field of Classification Search
CPC ................ F16H 25/20; F16H 2/2018; F16H 2025/2031; F16H 2025/2034; F16H 57/029; F16H 57/031; F16H 25/2018
See application file for complete search history.

(56) References Cited

U.S. PATENT DOCUMENTS

| | | | | |
|---|---|---|---|---|
| 5,125,281 A * | 6/1992 | Mottate | .................... | B23Q 1/58 384/50 |
| 5,131,125 A * | 7/1992 | Coron | ...................... | B23Q 1/58 198/346.1 |
| 5,234,386 A * | 8/1993 | Nagai | ...................... | B23Q 1/56 474/148 |
| 5,303,638 A * | 4/1994 | Green | ................... | F15B 15/084 277/551 |
| 6,662,672 B2 * | 12/2003 | Someya | .................. | F16H 25/20 74/89.22 |

(Continued)

FOREIGN PATENT DOCUMENTS

CN 201973100 U 9/2011
CN 104750106 A 7/2015
(Continued)

*Primary Examiner* — Adam D Rogers
(74) *Attorney, Agent, or Firm* — Muncy, Geissler, Olds & Lowe, P.C.

(57) ABSTRACT

A dustproofing device for use with a linear module includes a dustproofing band disposed around a first pulley pivotally connected to a first end unit and a second pulley pivotally connected to a second end unit. Two ends of the dustproofing band fixedly connect to a fixing platform. The fixing platform fixedly connects to a moving platform of the linear module. A top lid is fixedly disposed on the first end unit and the second end unit and covers the fixing platform, so as for the dustproofing device to be mounted on the linear module. Since the linear module is covered with the first end unit, a first lateral lid, the second end unit and the top lid, not only is the linear module rendered dustproof, but it also takes less time than before to mount the dustproofing device in place.

4 Claims, 8 Drawing Sheets

(56) References Cited

U.S. PATENT DOCUMENTS

| | | | | |
|---|---|---|---|---|
| 6,988,425 | B2* | 1/2006 | Nagai | F16H 7/023 474/144 |
| 7,220,198 | B2* | 5/2007 | Iida | B23Q 5/34 474/253 |
| 9,285,021 | B2* | 3/2016 | Chen | F16H 25/20 |
| 9,360,096 | B2* | 6/2016 | Lin | F16H 25/24 |
| 9,933,057 | B1* | 4/2018 | Peng | F16H 25/20 |

FOREIGN PATENT DOCUMENTS

| | | |
|---|---|---|
| JP | 3021071 U | 2/1996 |
| JP | 2003049921 A | 2/2003 |
| KR | 10-1309267 B1 | 9/2013 |
| TW | 201144633 A1 | 12/2011 |
| TW | I644033 B | 12/2018 |

* cited by examiner

DUSTPROOFING DEVICE FOR USE WITH LINEAR MODULE

BACKGROUND OF THE INVENTION

1. Technical Field

The present invention relates to dustproofing devices and, more particularly, to a dustproofing device for use with a linear module.

2. Description of Related Art

Owing to their advantages, namely high precision, high structural strength and compactness, linear modules are applied to industries related to precise machines, semiconductors, panels, foods, automobiles, and automation, for example. However, the aforesaid industries vary in environments in which linear modules operate. For instance, dustproofing-related requirements of linear modules for use in industries related to semiconductors, automation, panels, and foods are lenient, because dust is rare in workplaces of these industries. By contrast, linear modules for use in manufacturing processes, such as welding and coating, of the automotive industry operate in dusty workplaces, and thus intrusion of dust into the linear modules is serious enough to affect the linear modules' operation.

Japan published patent application 07-007837 discloses a linear module dustproofing structure that includes a linear module casing. A sealing band fits around pulleys disposed at two ends of the linear module casing to form a movable ring. Two ends of the sealing band are fixed to a trolley. The sealing band rotates endlessly together with the trolley driven by the linear module, thereby effectuating dustproofing. However, the dustproofing structure is mounted in the linear module, and the mounting process takes much time.

Japan published patent application 2003-049921 discloses a modularized dustproofing structure that works by reducing internal pressure of a linear actuator to not only reduce dust in the module but also minimize the chance of leakage of dust to the surroundings. The module has therein an air extracting device for reducing dust in the module and preventing leakage of dust to the surroundings. The air extracting device is replaceable with a blasting device for preventing intrusion of external dust into the module. Although the dustproofing structure achieves dustproofing, it is mounted in the linear module, and the mounting process takes much time.

BRIEF SUMMARY OF THE INVENTION

It is an objective of the present invention to provide a dustproofing device for use with a linear module such that mounting the dustproofing device on the linear module takes less time than before.

In order to achieve the above and other objectives, the present invention provides a dustproofing device for use with a linear module, comprising: a first end unit having a first receiving chamber and forming a first opening; a first pulley disposed in the first receiving chamber and pivotally connected to the first end unit; a first lateral lid having two opposing ends which a second opening and a third opening are disposed at, respectively, with the first lateral lid connecting to the first end unit, and the second opening being in communication with the first opening; a second end unit having a second receiving chamber and forming a fourth opening, with the second end unit connecting to the first lateral lid, and the fourth opening being in communication with the third opening; a second pulley disposed in the second receiving chamber and pivotally connected to the second end unit; a dustproofing band passing through the first opening and the second opening to wind on the first pulley and passing through the third opening and the fourth opening to wind on the second pulley; a fixing platform fixedly connecting to two ends of the dustproofing band; and a top lid fixedly disposed on the first end unit and adapted to cover the fixing platform.

Therefore, the dustproofing device of the present invention is directly disposed on the linear module, and the fixing platform fixedly connects onto the moving platform of the linear module, thereby rendering the linear module dustproof. With the dustproofing device being mounted in place outside the linear module, mounting the dustproofing device on the linear module takes less time than before and is convenient.

Preferably, the first pulley has a first wheel and a first pivot. The first wheel is pivotally connected to the first pivot. A first fixing chamber is formed on a wall of the first receiving chamber of the first end unit. Two spaced-apart first protruding posts are formed on a wall of the first fixing chamber. Tips of the first protruding posts are pointed at each other and positioned proximate to each other. The first pivot is inserted into the first fixing chamber and disposed between the first protruding posts, allowing the tips of the first protruding posts to abut against and secure the first pivot. Therefore, the first pulley is mounted in place conveniently, and it takes less time than before to mount the dustproofing device in place.

The tips of the first protruding posts point at each other to form a first bump each, with the first pivot inserted into the first fixing chamber and disposed between the first protruding posts, allowing the first bumps to abut against and secure the first pivot. Alternatively, the first fixing chamber forms a concave surface on a wall thereof between the first protruding posts, and the concave surface corresponds in contour to the first pivot. Hence, not only does it take less time than before to mount the dustproofing device in place, but the first pivot is also secured in place more firmly.

The first end unit forms a plurality of guiding posts at the periphery of the first opening, and the guiding posts protrude into the second opening as soon as the first lateral lid connects to the first end unit. Therefore, not only is it convenient to mount the first end unit and the first lateral lid in place, but it also take less time than before to mount the dustproofing device in place.

DETAILED DESCRIPTION OF THE INVENTION

Figure 1:
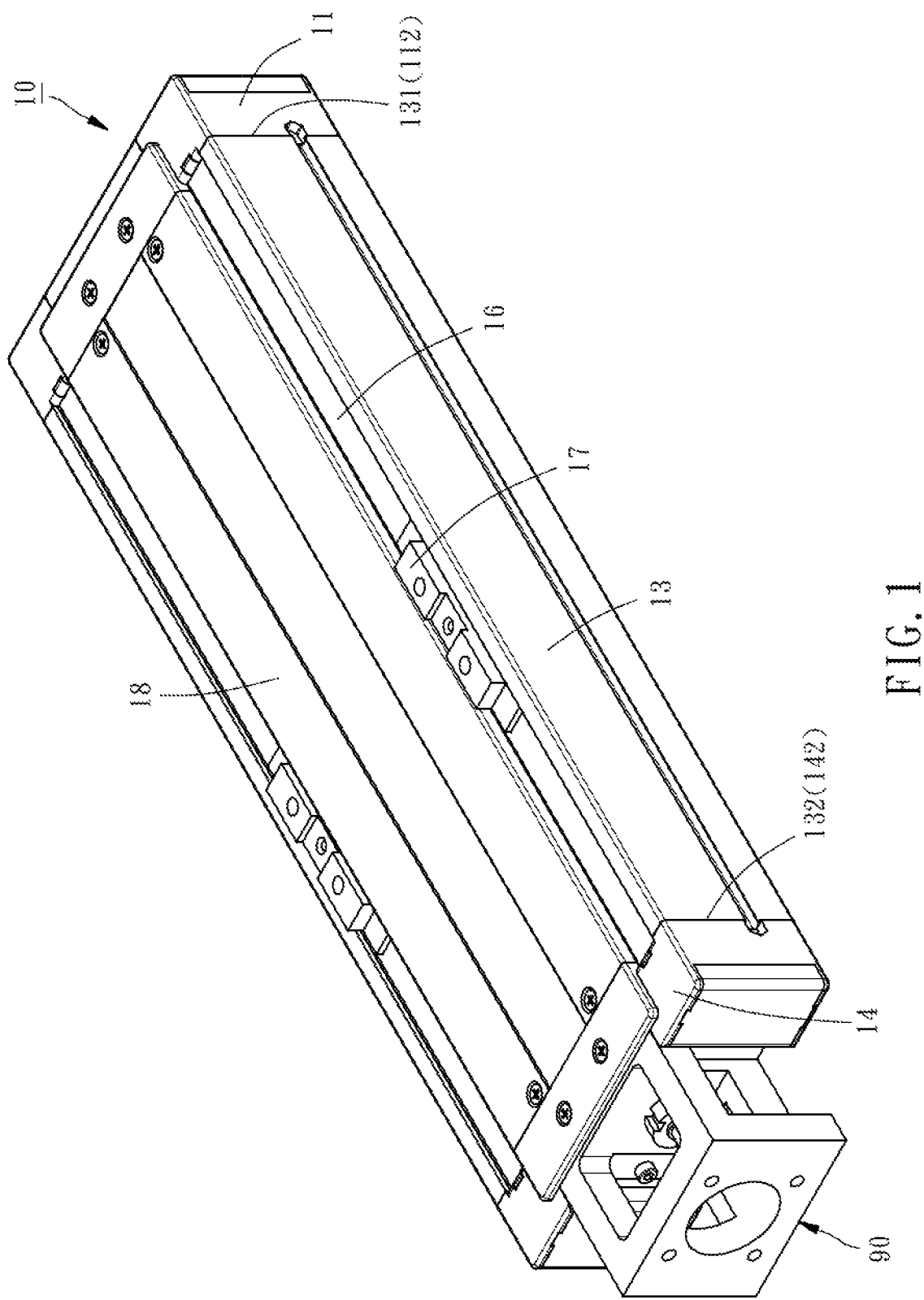
FIG. 1 is a perspective view of a dustproofing device according to the first preferred embodiment of the present invention.

Technical features of the present invention are illustrated by the preferred embodiment below and drawings and described hereunder.

Referring to FIGS. 1-5, a dustproofing device 10 for use with a linear module according to a preferred embodiment of the present invention, comprising a first end unit 11, a first pulley 12, a first lateral lid 13, a second end unit 14, a second pulley 15, a dustproofing band 16, a fixing platform 17 and a top lid 18.

The first end unit 11 has a first receiving chamber 111 and forms a first opening 112.

The first pulley 12 is disposed in the first receiving chamber 111 and pivotally connected to the first end unit 11.

A second opening 131 and a third opening 132 are disposed at two opposing ends of the first lateral lid 13, respectively. The first lateral lid 13 connects to the first end unit 11. The second opening 131 is in communication with the first opening 112.

The second end unit 14 has a second receiving chamber 141 and forms a fourth opening 142. The second end unit 14 connects to the first lateral lid 13, and the fourth opening 142 is in communication with the third opening 132.

The second pulley 15 is disposed in the second receiving chamber 141 and pivotally connected to the second end unit 14.

The dustproofing band 16 passes through the first opening 112 and the second opening 131 to wind on the first pulley 12 and passes through the third opening 132 and the fourth opening 142 to wind on the second pulley 15. In this embodiment, the dustproofing band 16 is a flexible band, such as a belt, a rubber band, and a thin steel band.

The fixing platform 17 fixedly connects to two ends of the dustproofing band 16 to fixedly connect to a moving platform of the linear module; hence, the linear module which the dustproofing device 10 of this embodiment is mounted on connects, through the fixing platform 17, to an external component to be driven by the linear module, thereby achieving linear module-based driving.

The top lid 18 is fixedly disposed on the first end unit 11 and the second end unit 14 and covers the fixing platform 17 to prevent intrusion of dust into the linear module.

Therefore, the dustproofing device 10 of the present invention is directly disposed on the linear module, and the fixing platform 17 fixedly connects onto the moving platform of the linear module, thereby rendering the linear module dustproof and maintaining the driving performance of the linear module by driving the fixing platform 17. With the dustproofing device 10 being mounted in place outside the linear module, mounting the dustproofing device 10 on the linear module takes less time than before and is convenient.

The aforesaid diagrams show that two dustproofing devices are mounted on the linear module. The two dustproofing devices mounted on the linear module are of the same structure in order to enhance structural stability; however, just one dustproofing device is sufficient to effectuate dustproofing.

The first pulley 12 is selectively integrally-formed or multi-piece. In this embodiment, as shown in FIGS. 5-9, the first pulley 12 is multi-piece. The first pulley 12 has a first wheel 121 and a first pivot 122. The first wheel 121 is pivotally connected to the first pivot 122. The first end unit 11 forms a first fixing chamber 113 on a wall of the first receiving chamber 111 and forms two spaced-apart first protruding posts 114 on a wall of the first fixing chamber 113. The tips of the first protruding posts 114 are pointed at each other and positioned proximate to each other. The first pivot 122 is inserted into the first fixing chamber 113 and disposed between the first protruding posts 114 such that the tips of the first protruding posts 114 abut against and secure the first pivot 122. Therefore, the first pulley 12 can be mounted in place conveniently. Furthermore, the tips of the first protruding posts 114 are pointed at each other and positioned proximate to each other to therefore automatically position the first pivot 122 in place between the walls of the first fixing chamber 113 and the first protruding posts 114. Therefore, mounting the dustproofing device on the linear module takes less time than before.

The tips of the first protruding posts 114 each form a first bump 114a in a manner that the first bumps 114a point at each other. The first pivot 122 is inserted into the first fixing chamber 113 and disposed between the first protruding posts 114 such that the first bumps 114a abut against and secure the first pivot 122. Alternatively, the first fixing chamber 113 forms a concave surface 113a on the wall thereof between the first protruding posts 114. The concave surface 113a corresponds in contour to the first pivot 122. Hence, not only does it take less time than before to mount the dustproofing device 10 in place, but the first pivot 122 is also secured in place more firmly.

The first end unit 11 forms a plurality of guiding posts 115 at the periphery of the first opening 112. The guiding posts 115 protrude into the second opening 131 as soon as the first lateral lid 13 connects to the first end unit 11. Therefore, not only are the first end unit 11 and the first lateral lid 13 mounted in place conveniently, but it also take less time than before to mount the dustproofing device 10 in place.

In this embodiment, after the dustproofing band 16 has fitted around the first pulley 12 and the second pulley 15 and two ends of the dustproofing band 16 have fixedly connected to the fixing platform 17, the dustproofing band 16 drives the first end unit 11 and the second end unit 14 toward the first lateral lid 13, so as to prevent the first end unit 11 and the second end unit 14 from separating from the first lateral lid 13.

Figure 2:
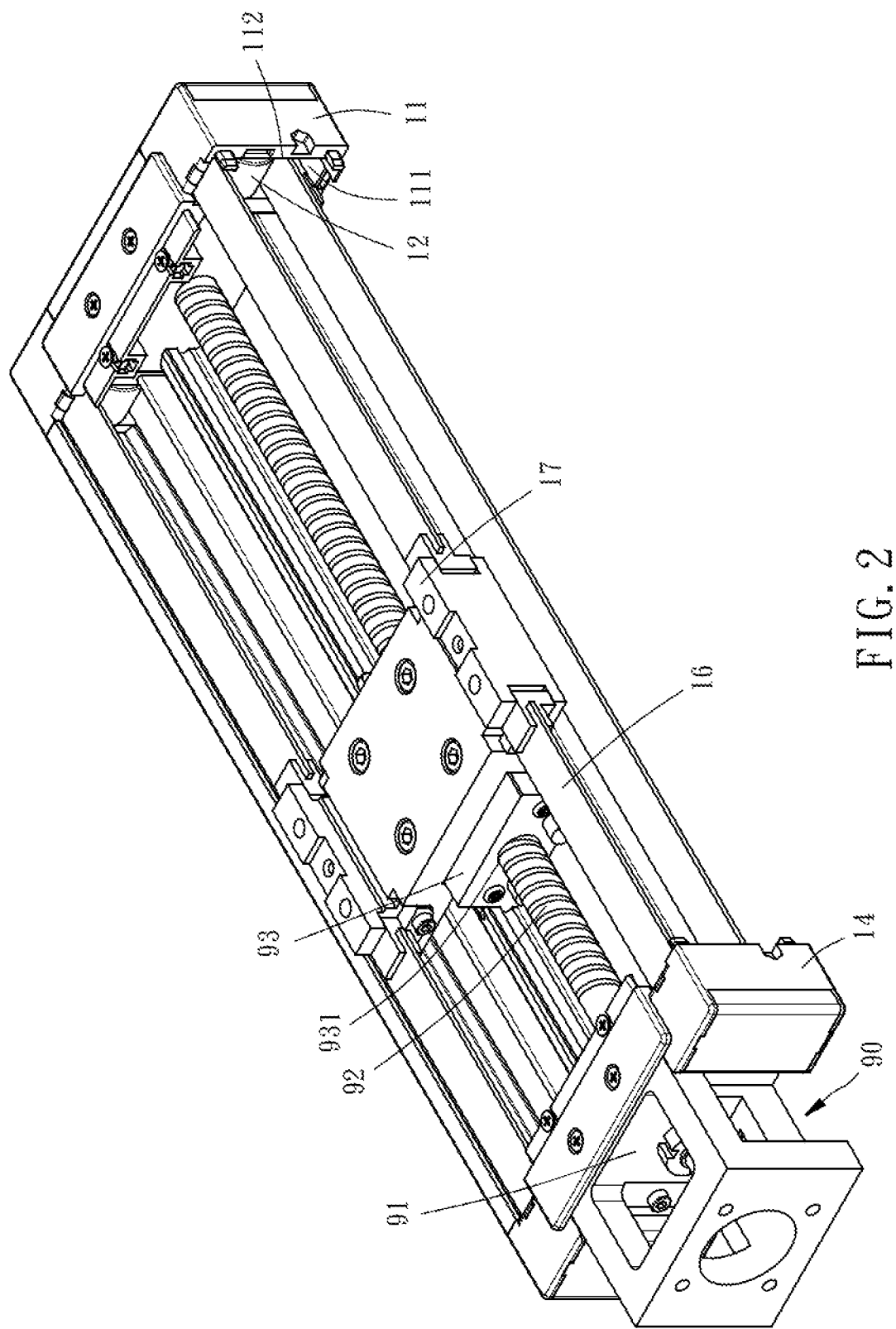
FIG. 2 is a cutaway view of the dustproofing device according to the first preferred embodiment of the present invention, without showing a top lid and a first lateral lid.
Figure 3:
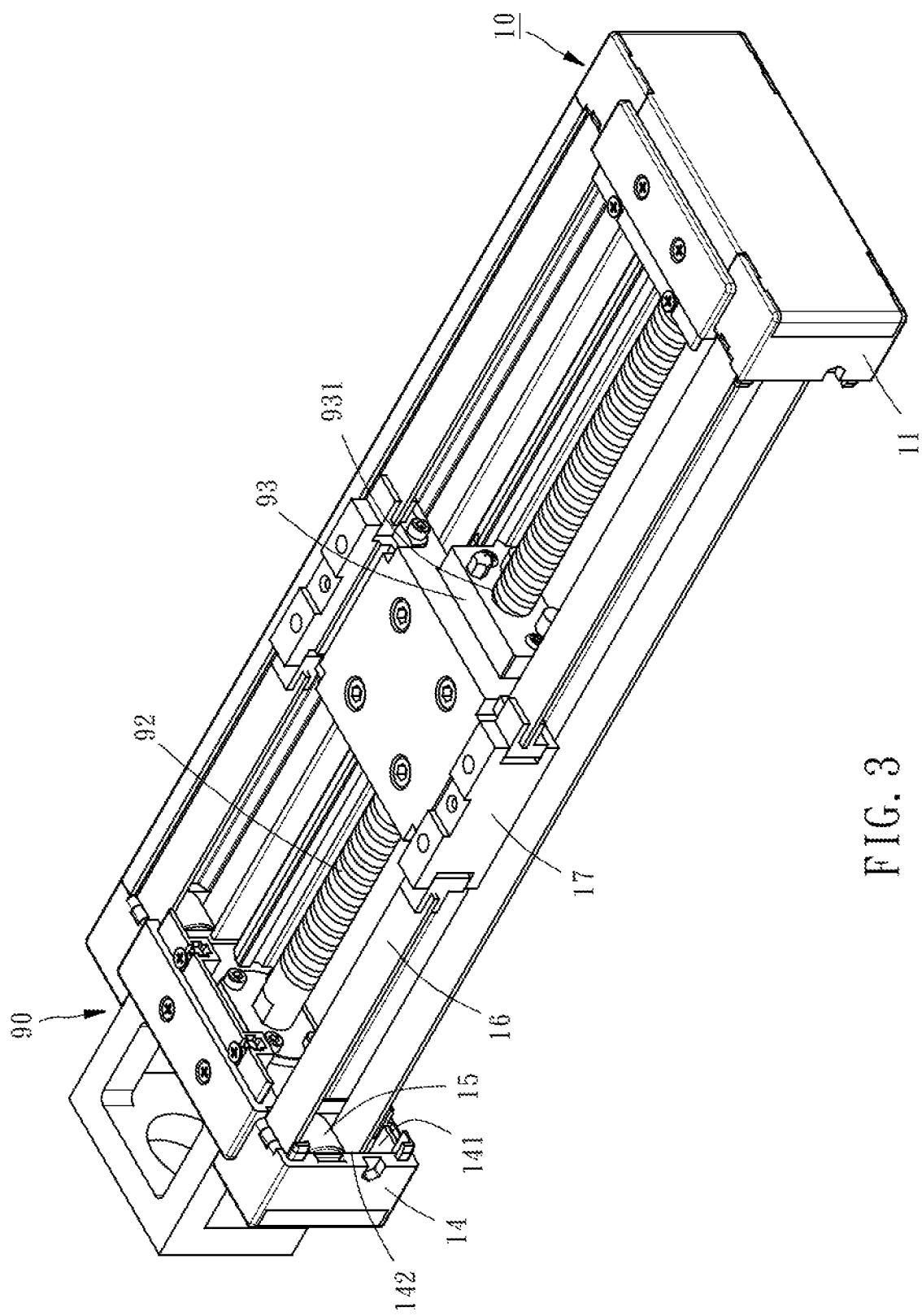
FIG. 3 is a cutaway view of the dustproofing device taken from another angle according to the first preferred embodiment of the present invention, without showing a top lid and a first lateral lid.
Figure 4:
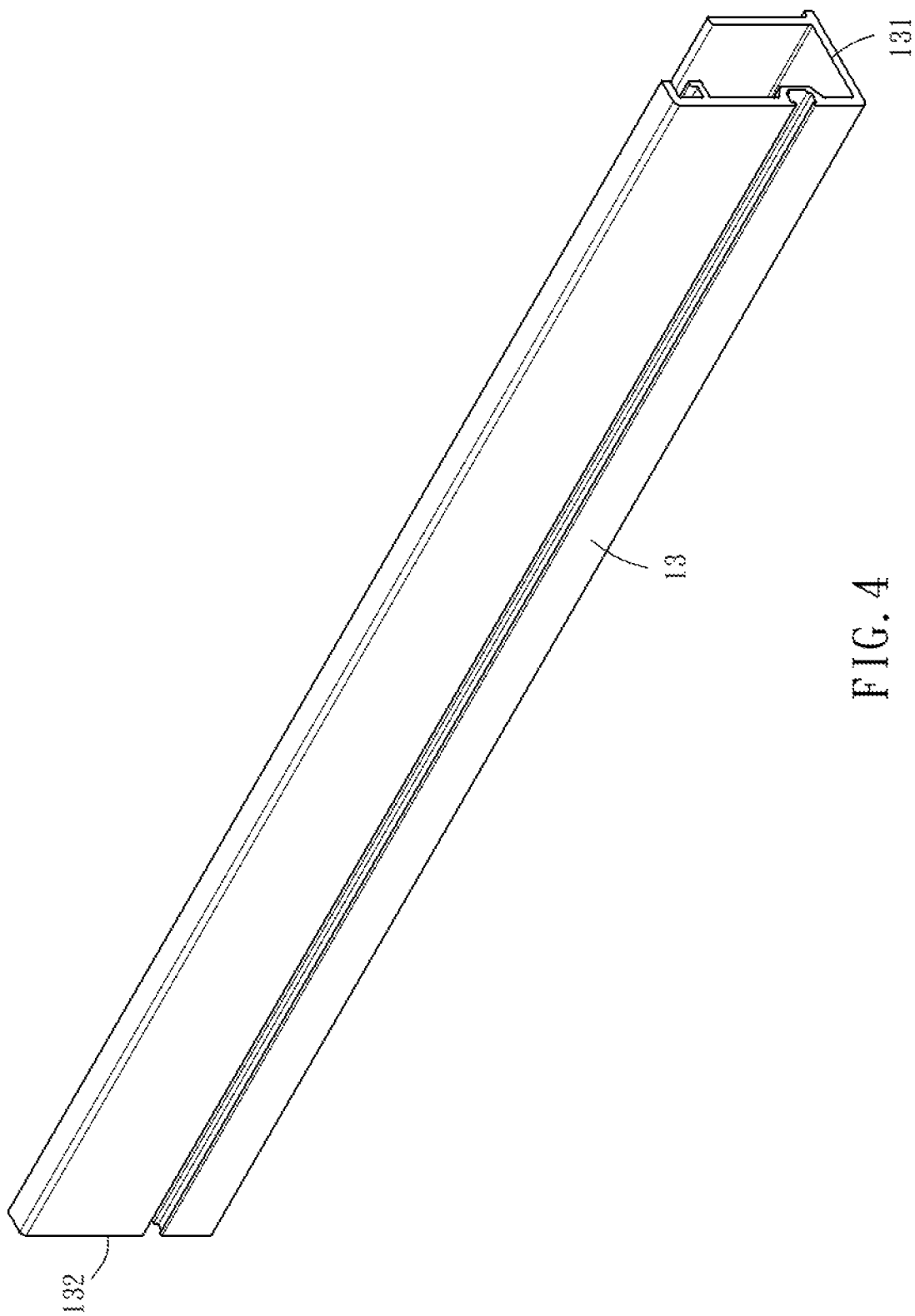
FIG. 4 is a partial perspective view of a first lateral lid of the dustproofing device according to the first preferred embodiment of the present invention.
Figure 5:
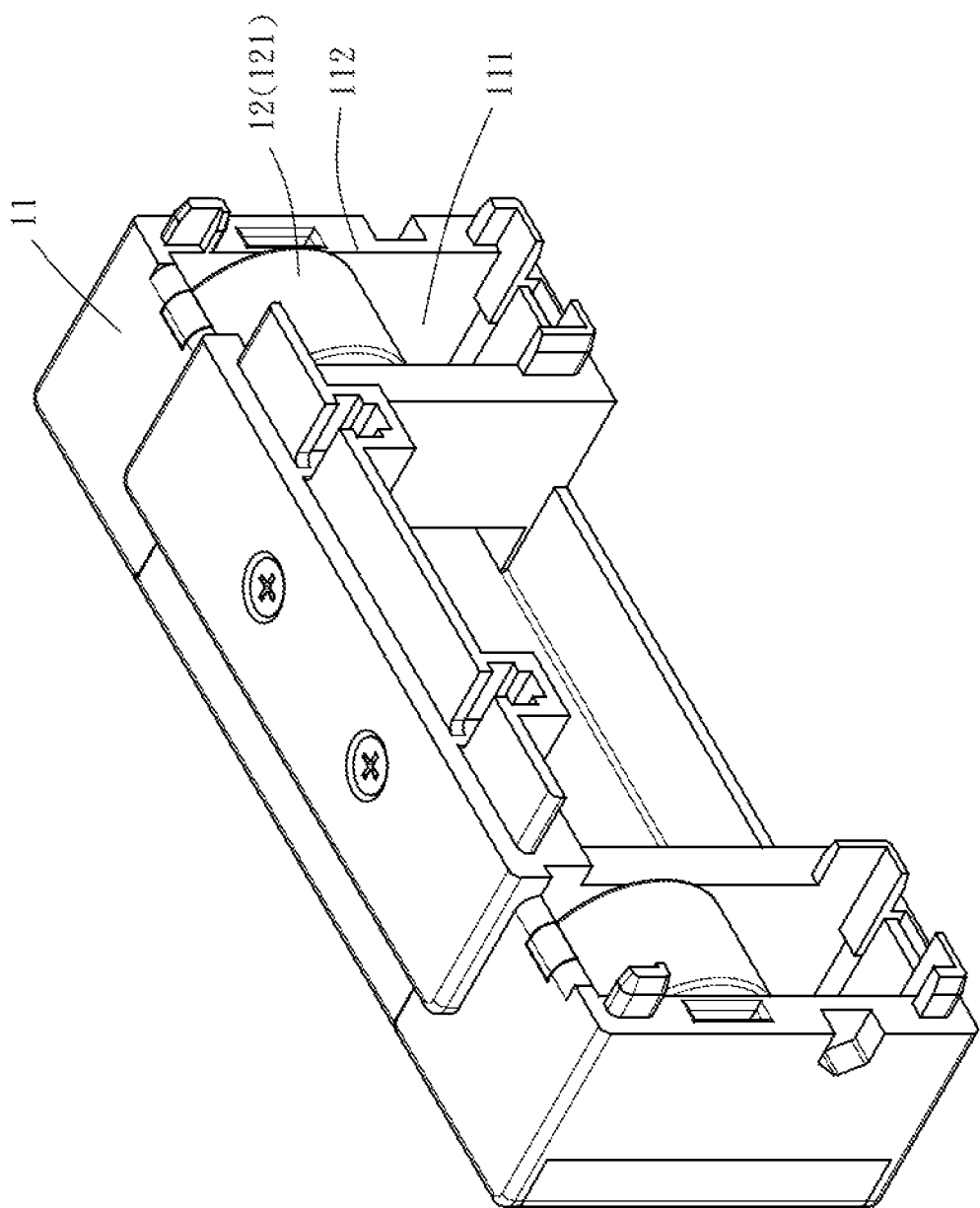
FIG. 5 is a cutaway view of the dustproofing device according to the first preferred embodiment of the present invention, showing a first end unit and a first pulley.
Figure 6:
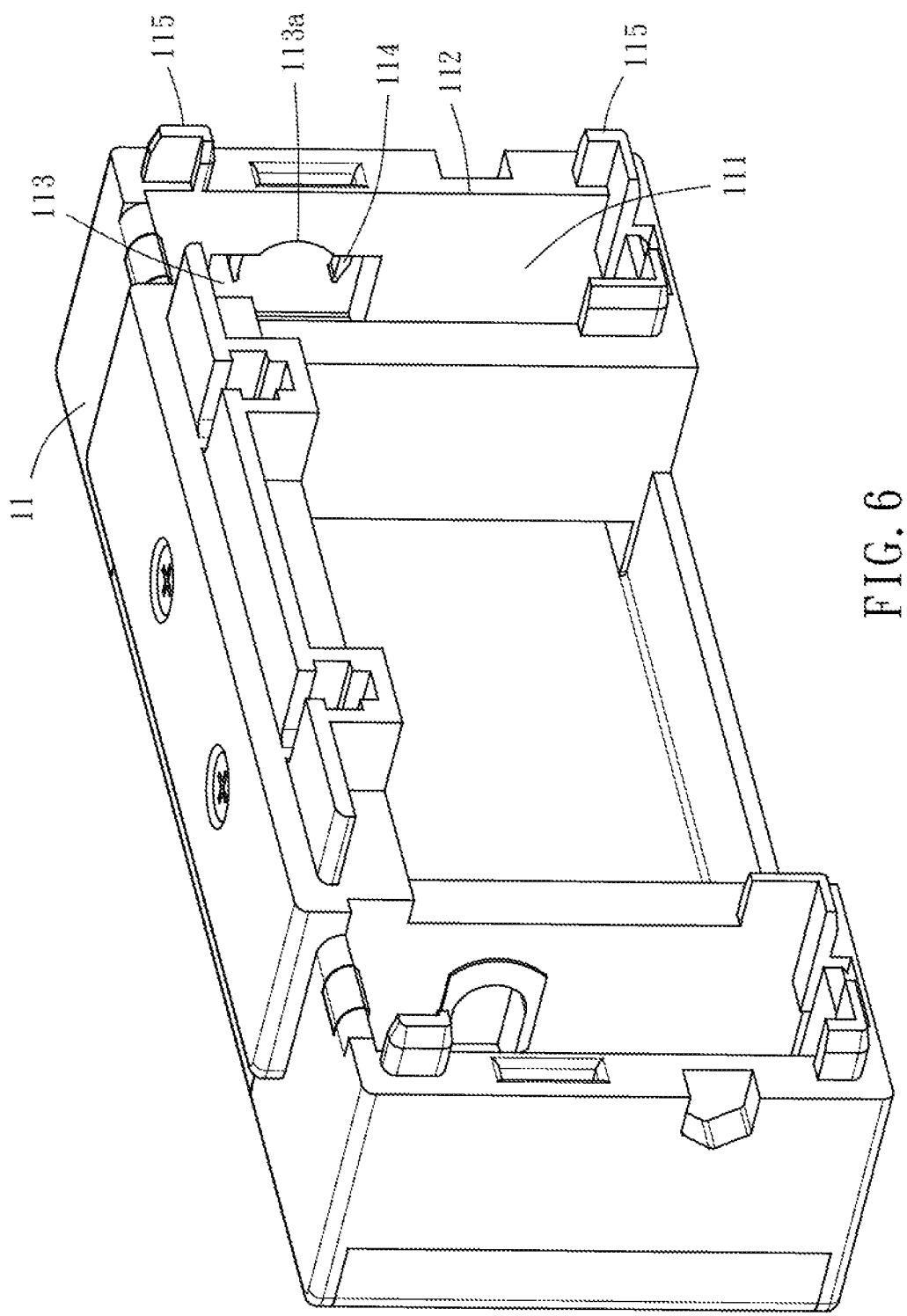
FIG. 6 is a cutaway view of the dustproofing device according to the first preferred embodiment of the present invention, showing the first end unit.
Figure 8:
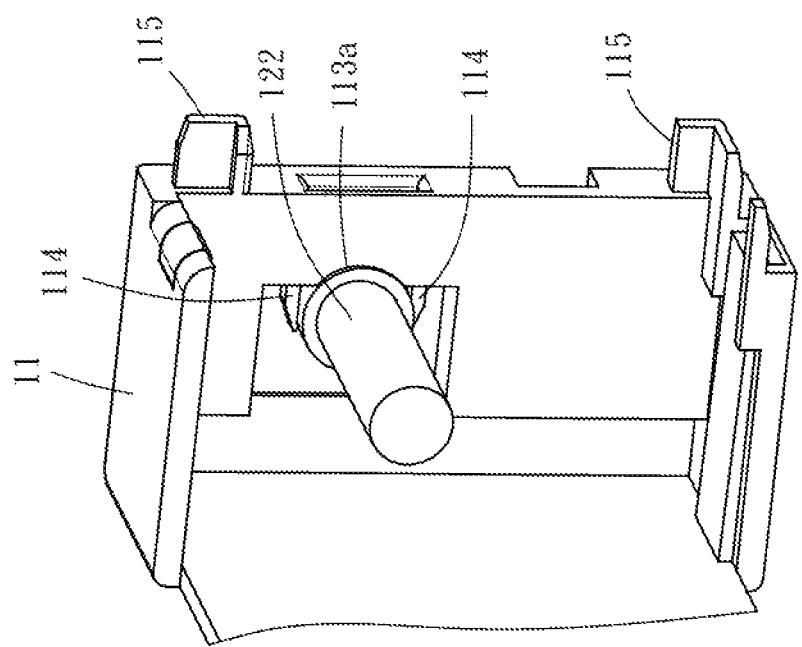
FIG. 8 is an enlarged view of the first end unit and a first pivot of the first pulley according to the first preferred embodiment of the present invention.
Figure 7:
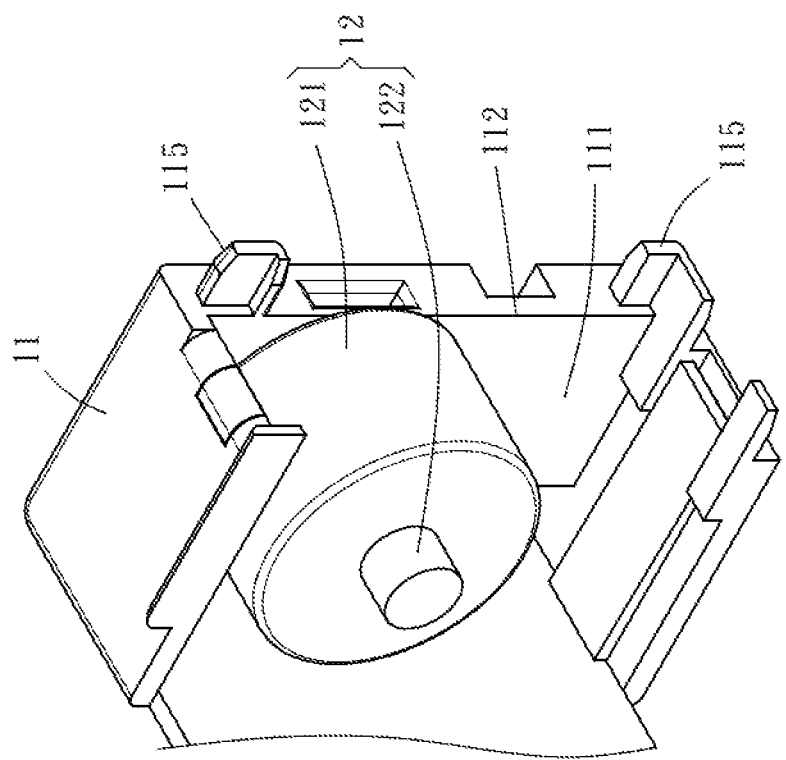
FIG. 7 is an enlarged view of the first end unit and the first pulley according to the first preferred embodiment of the present invention.
Figure 9:
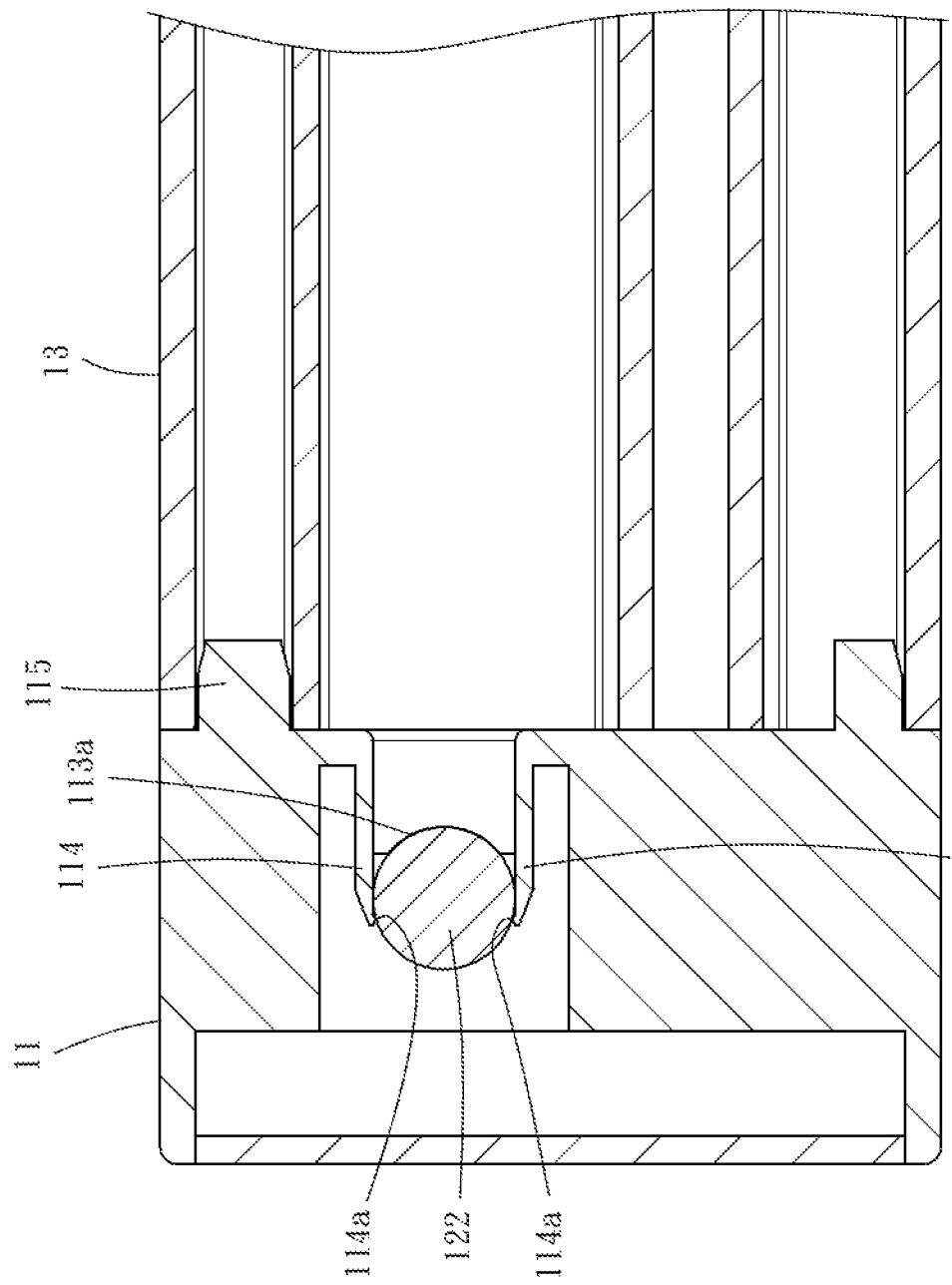
FIG. 9 is a partial cross-sectional view of the dustproofing device according to the first preferred embodiment of the present invention, showing how the first end unit, the first pulley and the first lateral lid are coupled together.

Operation of the dustproofing device 10 of this embodiment is described below. Referring to FIGS. 1-3, a linear module 90 has a casing 91, a screw 92 pivotally disposed at the casing 91, and a moving platform 93 with a nut portion 931. The nut portion 931 meshes with the screw 92. The nut portion 931 is driven by the screw 92 such that the moving platform 93 undergoes a reciprocating motion along the screw 92. A user mounts the dustproofing device 10 of this embodiment on the casing 91 of the linear module 90 such that the first end unit 11 and the second end unit 14 are disposed at two axial ends of the linear module 90, respectively, and fixed to the casing 91. Afterward, the user fixes the fixing platform 17 and the moving platform 93 of the linear module 90 in place such that the moving platform 93 drives the fixing platform 17 to translate. Finally, the user covers the fixing platform 17 with the top lid 18 to finalize the process of mounting the dustproofing device 10 on the linear module 90. Therefore, the linear module 90 is rendered dustproof when covered with the first end unit 11, the first lateral lid 13, the second end unit 14 and the top lid 18.

What is claimed is:

1. A dustproofing device for use with a linear module, comprising:
    a first end unit having a first receiving chamber and forming a first opening;
    a first pulley disposed in the first receiving chamber and pivotally connected to the first end unit;
    a first lateral lid having two opposing ends which a second opening and a third opening are disposed at, respectively, with the first lateral lid connecting to the first end unit, and the second opening being in communication with the first opening;
    a second end unit having a second receiving chamber and forming a fourth opening, with the second end unit connecting to the first lateral lid, and the fourth opening being in communication with the third opening;
    a second pulley disposed in the second receiving chamber and pivotally connected to the second end unit;
    a dustproofing band passing through the first opening and the second opening to wind on the first pulley and passing through the third opening and the fourth opening to wind on the second pulley;
    a fixing platform fixedly connecting to two ends of the dustproofing band; and
    a top lid fixedly disposed on the first end unit and adapted to cover the fixing platform;
    wherein the first pulley has a first wheel and a first pivot, with the first wheel pivotally connected to the first pivot, with a first fixing chamber formed on a wall of the first receiving chamber of the first end unit, and two spaced-apart first protruding posts formed on a wall of the first fixing chamber, such that tips of the first protruding posts are pointed at each other and positioned proximate to each other, with the first pivot inserted into the first fixing chamber and disposed between the first protruding posts, allowing the tips of the first protruding posts to abut against and secure the first pivot.

2. The dustproofing device for use with a linear module according to claim 1, wherein the tips of the first protruding posts point at each other to form a first bump each, with the first pivot inserted into the first fixing chamber and disposed between the first protruding posts, allowing the first bumps to abut against and secure the first pivot.

3. The dustproofing device for use with a linear module according to claim 1, wherein the first fixing chamber forms a concave surface on a wall thereof between the first protruding posts, the concave surface corresponding in contour to the first pivot.

4. The dustproofing device for use with a linear module according to claim 1, wherein the first end unit forms a plurality of guiding posts at a periphery of the first opening, and the guiding posts protrude into the second opening as soon as the first lateral lid connects to the first end unit.

* * * * *